United States Patent
Lee et al.

(10) Patent No.: US 11,081,283 B2
(45) Date of Patent: Aug. 3, 2021

(54) MULTI-LAYERED CERAMIC ELECTRONIC COMPONENT AND MOUNTING BOARD THEREOF

(71) Applicant: SAMSUNG ELECTRO-MECHANICS CO., LTD., Suwon-si (KR)

(72) Inventors: Yun Tae Lee, Suwon-si (KR); Kyung Moon Jung, Suwon-si (KR); Han Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 34 days.

(21) Appl. No.: 16/561,457

(22) Filed: Sep. 5, 2019

(65) Prior Publication Data

US 2020/0381180 A1 Dec. 3, 2020

(30) Foreign Application Priority Data

Jun. 3, 2019 (KR) .......................... 10-2019-0065361

(51) Int. Cl.
*H01G 4/30* (2006.01)
*H01G 4/012* (2006.01)
(Continued)

(52) U.S. Cl.
CPC ................. *H01G 4/30* (2013.01); *H01G 2/06* (2013.01); *H01G 4/012* (2013.01); *H01G 4/12* (2013.01); *H01G 4/228* (2013.01)

(58) Field of Classification Search
CPC ............ H01G 4/30; H01G 2/06; H01G 4/012; H01G 4/12; H01G 4/228
See application file for complete search history.

(56) References Cited

U.S. PATENT DOCUMENTS 6,171,644 B1 * 1/2001 Jinno ..................... H01C 1/034
427/79
6,214,685 B1 * 4/2001 Clinton .................. H01C 1/034
438/382

(Continued)

FOREIGN PATENT DOCUMENTS

JP H06-244051 A 9/1994
JP 2008-294008 A 12/2008

(Continued)

OTHER PUBLICATIONS

Office Action issued in corresponding Korean Patent Application No. 10-2019-0065361 dated Jul. 8, 2020, with English translation.

*Primary Examiner* — Dion Ferguson
(74) *Attorney, Agent, or Firm* — Morgan, Lewis & Bockius LLP

(57) ABSTRACT

A multilayer ceramic electronic component and a mounting board thereof include a reinforcing member that is disposed on upper and lower surfaces of a ceramic body of the multilayer ceramic electronic component and that is bonded to the first and the second external electrodes. The reinforcing member provides reduced occurrence of cracking and reduced stress applied to the component. The reinforcing member may have a coefficient of thermal expansion (CTE) that is within a range of 1 to 4 times a coefficient of thermal expansion of a dielectric layer of the ceramic body, and/or may have a modulus that is 0.5 or more times a modulus of the dielectric layer.

19 Claims, 9 Drawing Sheets

(51) Int. Cl.
*H01G 2/06* (2006.01)
*H01G 4/228* (2006.01)
*H01G 4/12* (2006.01)

(56) References Cited

U.S. PATENT DOCUMENTS

| | | | |
|---|---|---|---|
| 10,361,035 B1* | 7/2019 | Song | H01G 4/224 |
| 10,395,840 B1* | 8/2019 | Park | H01G 4/224 |
| 2005/0229388 A1* | 10/2005 | Deng | H01C 17/02 |
| | | | 29/621 |
| 2006/0180899 A1* | 8/2006 | Ko | H01C 7/001 |
| | | | 257/634 |
| 2010/0302704 A1* | 12/2010 | Ogawa | H01G 4/2325 |
| | | | 361/306.3 |
| 2011/0193448 A1* | 8/2011 | Saruban | H01G 4/005 |
| | | | 310/311 |
| 2013/0279227 A1* | 10/2013 | Yoshitake | H01G 4/002 |
| | | | 363/131 |
| 2014/0085767 A1* | 3/2014 | Kang | H01G 4/30 |
| | | | 361/301.4 |
| 2014/0376151 A1* | 12/2014 | Kim | H01G 4/30 |
| | | | 361/301.4 |
| 2015/0318113 A1* | 11/2015 | Kim | H01G 4/005 |
| | | | 174/260 |
| 2015/0325369 A1* | 11/2015 | Inoue | C23C 18/1882 |
| | | | 336/200 |
| 2015/0348712 A1* | 12/2015 | Lee | H01G 4/1227 |
| | | | 174/260 |
| 2016/0042864 A1* | 2/2016 | Hong | H01G 4/30 |
| | | | 361/301.4 |
| 2016/0172110 A1* | 6/2016 | Otani | H01L 41/0472 |
| | | | 361/301.4 |
| 2016/0196918 A1* | 7/2016 | Hong | H01G 4/232 |
| | | | 174/260 |
| 2016/0336114 A1 | 11/2016 | Nishimura et al. | |
| 2017/0076868 A1 | 3/2017 | Noda et al. | |
| 2017/0142838 A1* | 5/2017 | Kurosawa | H01G 4/018 |
| 2019/0198248 A1* | 6/2019 | Son | H01G 2/06 |

FOREIGN PATENT DOCUMENTS

| | | |
|---|---|---|
| JP | WO2015/108151 A1 | 7/2015 |
| JP | 2017-59631 A | 3/2017 |
| JP | 2018-139308 A | 9/2018 |
| KR | 10-2015-0047384 A | 5/2015 |
| KR | 10-2015-0049162 A | 5/2015 |
| KR | 10-2015-0051421 A | 5/2015 |

* cited by examiner

I-I'

II-II'

MULTI-LAYERED CERAMIC ELECTRONIC COMPONENT AND MOUNTING BOARD THEREOF

CROSS-REFERENCE TO RELATED APPLICATION(S)

This application claims benefit of priority to Korean Patent Application No. 10-2019-0065361 filed on Jun. 3, 2019 in the Korean Intellectual Property Office, the disclosure of which is incorporated herein by reference in its entirety.

BACKGROUND

1. Field

The present disclosure relates to a multilayer ceramic electronic component and a mounting board thereof.

2. Description of Related Art

Recently, use of electronic devices using multilayer ceramic capacitors (MLCC) has rapidly increased. In particular, in the case of smart phones, the number of capacitors in each device has increased and the capacity of required of each capacitor has increased with the advent of the 5G era. On the other hand, due to miniaturization of devices, the mounting area allocated for passive elements such as MLCCs and inductors is reduced and, accordingly, further miniaturization and thinning of the passive elements is required. Accordingly, it is considered that a multilayer ceramic capacitor and an inductor are packaged with an integrated circuit (IC) and an application processor (AP), or a multilayer ceramic capacitor and an inductor are mounted in a lower end portion of the AP as a LSC type to increase a degree of freedom of mounting.

In the case described above, there is growing demand for a thin multilayer ceramic capacitor product since such a product is effective not only for reducing the mounting area but also for reducing the equivalent series inductance (ESL) generated in a board.

However, a multilayer ceramic capacitor has reduced capacitance when a thickness thereof is thin, such that the multilayer ceramic capacitor generally maintains capacitance in a manner of increasing a length and a width. In this case, the capacitor has a thickness thinner than the length, and cracks may occur when external stress such as thermal load, or the like, act thereon.

Accordingly, for commercial application of the thin multilayer ceramic capacitor, there is need to improve the structural reliability by relaxing stress applied to the thin multilayer ceramic capacitor and providing a structure of a multilayer ceramic capacitor capable of preventing cracks to improve the structural reliability.

SUMMARY

An aspect of the present disclosure is to provide a multilayer ceramic electronic component and a mounting board thereof capable of preventing cracking.

Another aspect of the present disclosure is to provide a multilayer ceramic electronic component and a mounting board thereof capable of relaxing stress applied to the components.

According to an aspect of the present disclosure, a multilayer ceramic electronic component may include a ceramic body including a dielectric layer and having a first surface and a second surface opposing each other, a third surface and a fourth surface opposing each other, and a fifth surface and a sixth surface opposing each other. A first external electrode and a second external electrode are respectively disposed on the fifth surface and the sixth surface of the ceramic body, and a reinforcing member is bonded to the first external electrode and the second external electrode and disposed on the first surface and the second surface.

According to another aspect of the present disclosure, a mounting board of the multilayer ceramic electronic component may include a printed circuit board having two or more electrode pads, a multilayer ceramic electronic component mounted on the printed circuit board, and a soldering connecting the electrode pads and the multilayer ceramic electronic component. The multilayer ceramic electronic component includes a ceramic body including a dielectric layer and having a first surface and a second surface opposing each other, a third surface and a fourth surface opposing each other, and a fifth surface and a sixth surface opposing each other. A first external electrode and a second external electrode are respectively disposed on the fifth surface and the sixth surface of the ceramic body, and a reinforcing member is bonded to the first external electrode and the second external electrode and disposed on the first and second surfaces.

According to a further aspect of the present disclosure, a multilayer ceramic capacitor includes a ceramic body including a plurality of first internal electrodes and a plurality of second internal electrodes alternately stacked with dielectric layers therebetween. First and second external electrodes are disposed on opposing surfaces of the ceramic body opposite each other in a stacking direction of the pluralities of first and second internal electrodes. A reinforcing member is disposed in a space between the first and second external electrodes on the opposing surfaces of the ceramic body opposite each other in the stacking direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
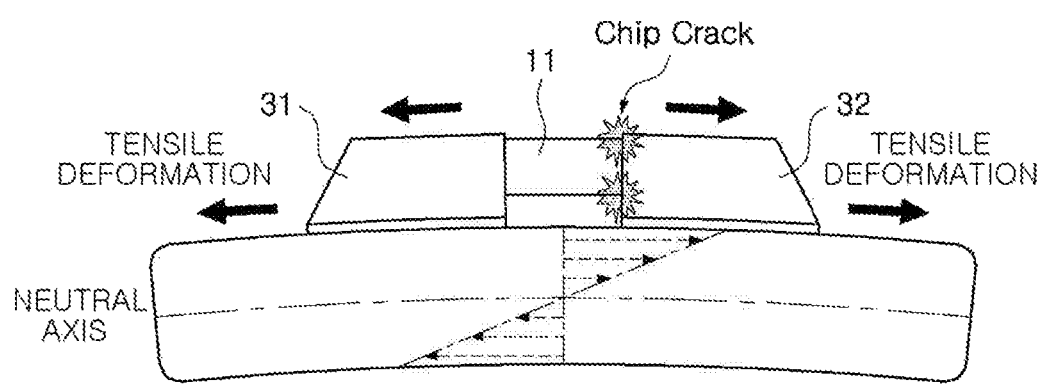
FIG. 1 is a schematic perspective view illustrating a crack generated in a multilayer ceramic electronic component.

Hereinafter, exemplary embodiments of the present disclosure will now be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

Throughout the specification, when a component is referred to as "comprise" or "comprising" other elements, it means that it may include other components as well, rather than excluding other components, unless specifically stated otherwise.

The present disclosure relates to a multilayer ceramic electronic component. The electronic component may be a capacitor, an inductor, a piezoelectric element, a varistor, a thermistor, or the like.

FIG. 1 is a perspective view illustrating a multilayer ceramic electronic component 11 having external electrodes 31, 32 applied on a board. Referring to FIG. 1, when external tensile stress, or the like, is applied, cracks may occur in the multilayer ceramic electronic component 11. For example, when an external thermal load is applied, coefficients of thermal expansion of the board, the solder, and the multilayer ceramic electronic component may be different from each other, and thermal stress may thus be generated by uneven expansion of the various elements. A crack of the electronic component may occur in a portion in which such stress is concentrated. The present disclosure relates to a multilayer ceramic electronic component capable of relaxing external stress to prevent such cracking.

A multilayer ceramic electronic component according to an embodiment of the present disclosure may include a ceramic body including a dielectric layer, and having a first surface and a second surface, opposite each other, a third surface and a fourth surface, opposite each other, and a fifth surface and a sixth surface, opposite each other; a first external electrode and a second external electrode respectively disposed on the fifth surface and the sixth surface of the ceramic body; and a reinforcing member bonded to the first external electrode and the second external electrode and disposed on the first surface and the second surface.

Figure 10:
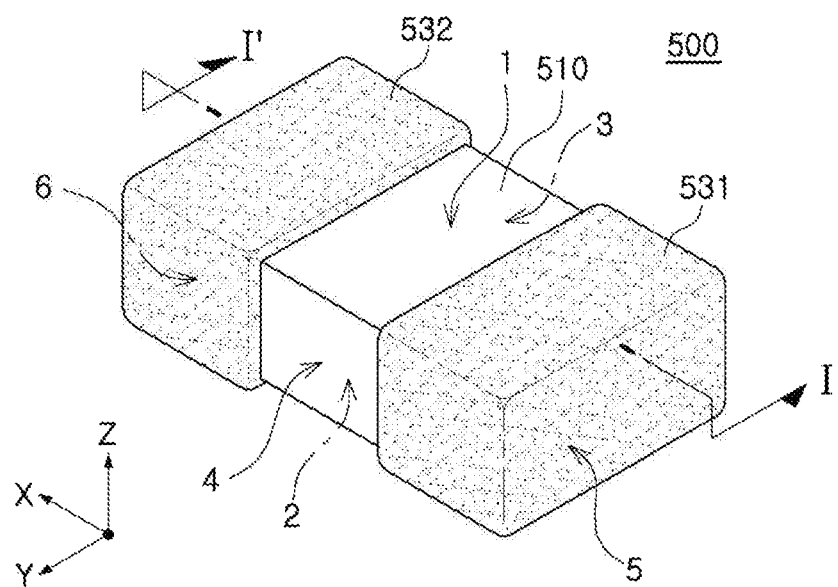
FIG. 10 is a perspective view of a multilayer ceramic capacitor before attaching a reinforcing material according to an embodiment of the present disclosure.

FIG. 10 is a perspective view of a multilayer ceramic electronic component 500. Referring to FIG. 10, the ceramic body 510 of the multilayer ceramic electronic component 500 according to the present disclosure may have a first surface 1 and a second surface 2, opposite each other in a Z axis direction, a third surface 3 and a fourth surface 4, connected to the first and second surfaces and opposite each other in a Y axis direction, and a fifth surface 5 and a sixth surface 6 connected to the first to fourth surfaces and opposite each other in a X axis direction.

In an embodiment of the present disclosure, the ceramic body 510 is not particularly limited in shape, buy may be in a shape of a hexahedron as shown.

The X, Y, and Z directions shown in the drawing may correspond to a longitudinal direction, a width direction, and a thickness direction, respectively. Here, the thickness direction may be used in the same direction as a lamination direction in which dielectric layers are stacked and laminated in the ceramic body 510.

According to an embodiment of the present disclosure, a first external electrode 531 and a second external electrode 532 may be disposed on the fifth and sixth surfaces of the ceramic body 510, respectively. In addition, a reinforcing member (e.g., 551 and 552 in FIG. 11) may be disposed on the first and second surfaces of the ceramic body. The reinforcing member 551 and 552 may be in contact with the first and second surfaces of the ceramic body 510, and may be bonded to the first external electrode 531 and the second external electrode 532. In the present specification, "adhesion" may mean a state in which surfaces of an adhering material and an adherend are bonded to each other by a bonding force of an interface. The bonding force of the interface may be due to a chemical interaction between surface molecules of the adhering material and the adherend, or may be due to mechanical bonding.

The reinforcing member 551 and 552 may be bonded to the first external electrode 531 and the second external electrode 532 by physical or chemical bonding. The tensile strength required for separating the reinforcing member 551 and 552 from the first external electrode 531 or the second external electrode 532 is greater than the adhesive force therebetween, and the adhesive force between the reinforcing member 551 and 552 and the first external electrode 531 or the second external electrode 532 is not particularly limited, but may, for example, be 1 Mpa or more.

Figure 2:
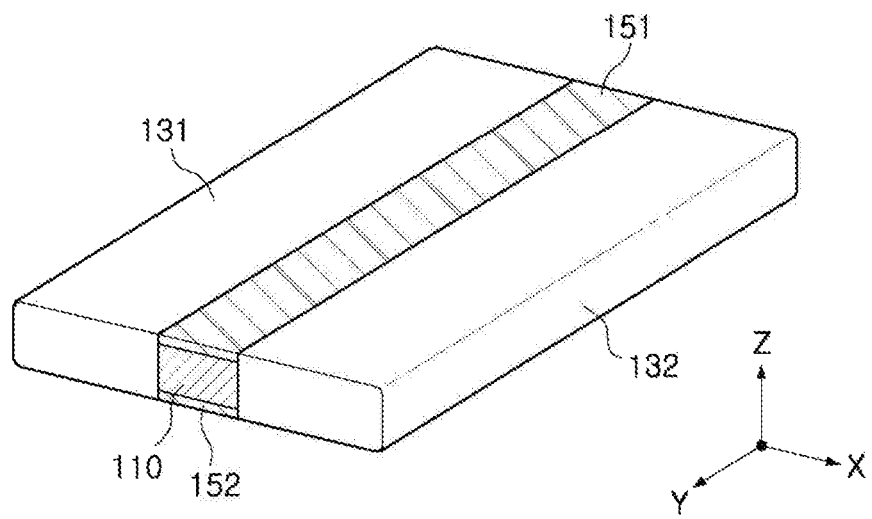
FIG. 2 is a perspective view illustrating a multilayer ceramic electronic component according to an embodiment of the present disclosure.

FIG. 2 is a perspective view illustrating a multilayer ceramic electronic component according to an embodiment of the present disclosure. Referring to FIG. 2, a multilayer ceramic electronic component may include a ceramic body 110 including a dielectric layer; a first external electrode 131; and a second external electrode 132. In addition, a reinforcing member 151 is disposed on the first surface and a reinforcing member 152 is disposed on the second surface of the ceramic body and bonded to the first external electrode 131 and the second external electrode 132.

Figure 3:
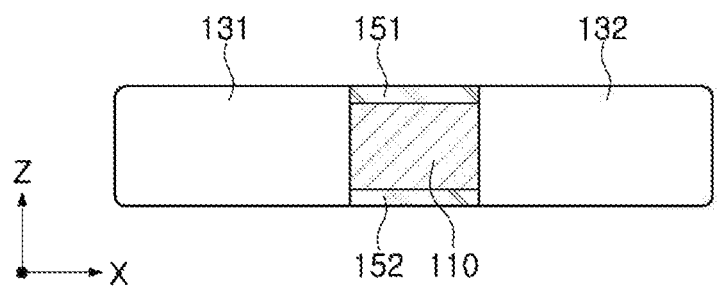
FIG. 3 is a front view of the multilayer ceramic electronic component of FIG. 2.

FIG. 3 is a front view of the multilayer ceramic electronic component of FIG. 2 viewed from a Y axis direction. Referring to FIG. 3, the reinforcing members 151 and 152 of the present disclosure may be disposed opposite each other in a Z axis direction with the ceramic body 110 interposed therebetween, and may each be bonded to both of the first external electrode 131 and the second external electrode 132.

Since the reinforcing members 151 and 152 are bonded to the first external electrode 131 and the second external electrode 132, stress from a source external to the electronic component may be relaxed and the cracks may be prevented.

In another embodiment of the present disclosure, a coefficient of thermal expansion (CTE) of the reinforcing member 151 or 152 included in the multilayer ceramic electronic component according to the present disclosure may be within a range of 1 to 4 times the coefficient of thermal expansion of the dielectric layer. The coefficient of thermal expansion may be a value measured under a condition at a starting temperature of 25° C. and a rate of temperature increase of 5° C./min at a load of 0.05N and a pressure of 1 atm. The coefficient of thermal expansion may be a value measured by a thermomechanical analyzer (TMA) equipment such as TMA Q400 from TA instruments.

Since the coefficient of thermal expansion of the reinforcing member of the multilayer ceramic electronic component according to the present disclosure is within the range of 1 to 4 times the coefficient of thermal expansion of the dielectric layer, stress due to external heat may be effectively reduced, and cracks due to external stress may be prevented. The coefficient of thermal expansion of the reinforcing member is not particularly limited as long as it satisfies the range of 1 to 4 times the coefficient of thermal expansion of the dielectric layer. For example, the coefficient of thermal expansion of the reinforcing member may be 3.8 ppm/° C. or more, 4.2 ppm/° C. or more, 4.8 ppm/° C. or more, 5.4 ppm/° C. or more, 6.0 ppm/° C. or more, 6.6 ppm/° C. or more, 7.2 ppm/° C. or more, 7.4 ppm/° C. or more, 7.6 ppm/° C. or more, and may be 38 ppm/° C. or less, 36 ppm/° C. or less, 34 ppm/° C. or less, 32 ppm/° C. or less, 31 ppm/° C. or less, or 30.4 ppm/° C. or less.

Figure 15:
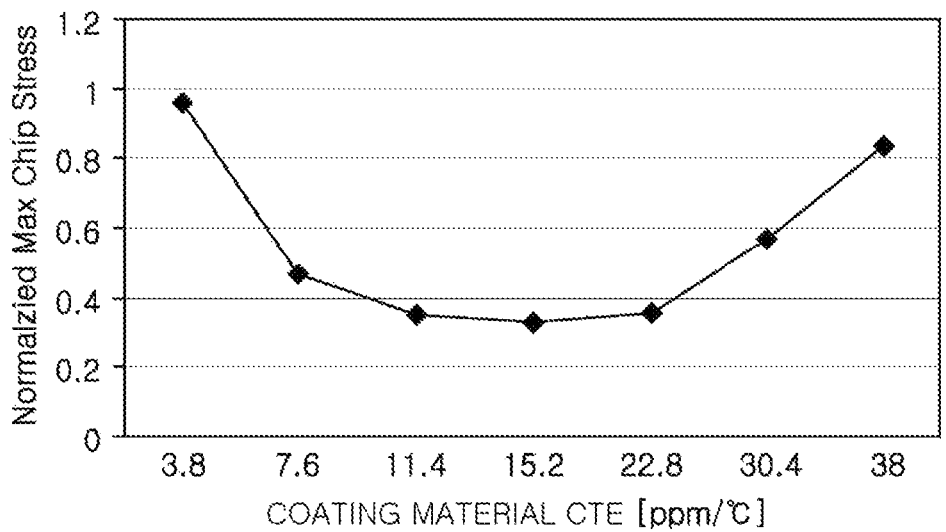
FIG. 15 is a graph illustrating a change in stress with respect to a change in a coefficient of thermal expansion of a reinforcing member according to the present disclosure.

FIG. 15 is a graph illustrating a relative value of the maximum stress that can be applied to an electronic component without causing damage when a reinforcing member is applied, relative to the stress that can be applied when a reinforcing member is not applied, with respect to a change in the coefficient of thermal expansion (CTE) of the reinforcing member according to the present disclosure.

Referring to FIG. 15, it can be confirmed that as the coefficient of thermal expansion of the reinforcing member increases, the maximum stress that the electronic component is subjected to is lowered before the stress tends to increase beyond a certain level. It indicates that the maximum stress that the chip is subjected to, in chips in which the reinforcing member is applied to the dielectric layer, may be reduced when the coefficient of thermal expansion of the reinforcing member is near that of the dielectric layer; however, the stress that the chip is subjected to may be increased when the coefficient of thermal expansion of the reinforcing member is substantially above or below that of the dielectric layer.

FIG. 15 is a graph based on a case in which the coefficient of thermal expansion of the dielectric layer is about 7.6 ppm/° C. Referring to FIG. 15, it can be confirmed that the stress that the electronic component is subjected to is greatly reduced to less than 60% of the maximum normalized value in a range of 7.6 ppm/° C. (e.g., a value of the coefficient of thermal expansion of the reinforcing member corresponding to 1 times the coefficient of thermal expansion of the dielectric layer) to 30.4 ppm/° C. (e.g., a value of the coefficient of thermal expansion of the reinforcing member corresponding to 4 times the coefficient of thermal expansion of the dielectric layer).

That is, referring to the above results, when the coefficient of thermal expansion of the reinforcing member according to an embodiment of the present disclosure has a value included within the range of 1 to 4 times the coefficient of thermal expansion of the dielectric layer, stress due to external heat may be effectively reduced, and cracks due to external stress may be prevented.

In another embodiment of the present disclosure, a modulus of a reinforcing member of the multilayer ceramic electronic component may be 0.5 or more times of a modulus of a dielectric layer. The modulus may mean a Young's Modulus, and may be, for example, a value measured at 25° C. and 1 atmospheric pressure (atm) using a dynamic mechanical analysis (DMA) such as TMA Q400 from TA Instruments. An upper limit of the modulus of the reinforcing member is not particularly limited, but may be, for example, 50 or less times the modulus of the dielectric layer. The modulus of the reinforcing member according to the present disclosure is not particularly limited as long as it is in a range of 0.5 or more times the modulus of the dielectric layer, but may be, for example, 40.0 GPa or more, 41.0 GPa or more, 41.5 GPa or more, 42.0 GPa or more, 42.5 GPa or more, 43.0 GPa or more, 43.5 GPa or more. 44.0 GPa or more, 44.5 GPa or more, 45.0 GPa or more or 45.5 GPa or more, and an upper limit of thereof is not particularly limited, but may be 4500 GPa or less. When the modulus of the reinforcing member according to the present disclosure satisfies the above range, the stress applied to the electronic component may be further alleviated.

Figure 16:
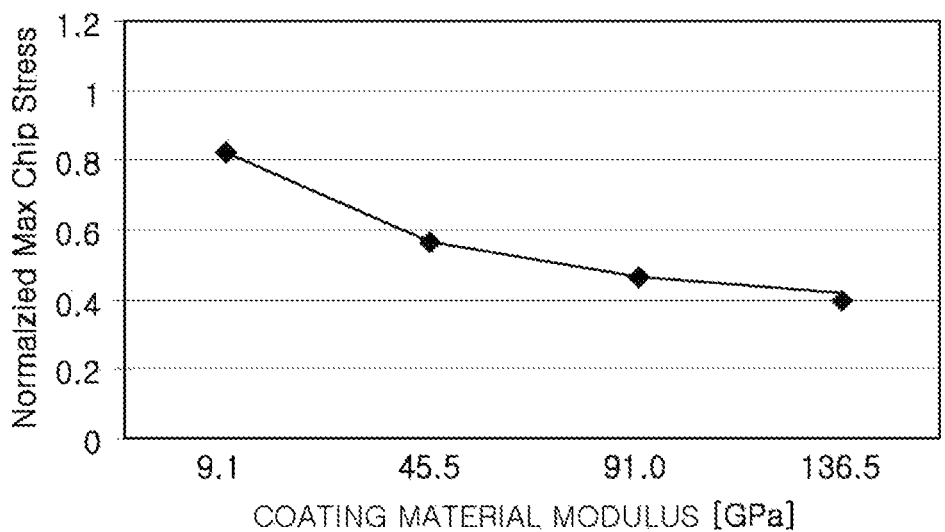
FIG. 16 is a graph illustrating a change in stress with respect to a change in modulus of the reinforcing member according to the present disclosure.

FIG. 16 is a graph illustrating a relative value of the normalized maximum stress that an electronic component is subjected to when a reinforcing member is applied, in comparison to stress when the reinforcing member is not applied, with respect to a change in the modulus of the reinforcing member according to the present disclosure.

Referring to FIG. 16, it can be confirmed that the stress that the electronic component is subjected to decreases as the modulus of the reinforcing member increases, which may mean a degree of change with respect to the external stress decreases as the modulus of the reinforcing member increases. Therefore, the modulus of the reinforcing member may be increased to significantly reduce an influence of external stress applied to the electronic component.

FIG. 16 is a graph based on a case in which the modulus of the dielectric layer is 91.0 GPa. Referring to FIG. 16, it can be confirmed that the stress applied to the electronic component is greatly reduced to less than 60% when the modulus of the reinforcing member is about 45.5 GPa, corresponding to 0.5 times the modulus of the dielectric layer.

That is, referring to the above results, when the modulus of the reinforcing member according to an embodiment of the present disclosure is included within a range of 0.5 or more times the modulus of the dielectric layer, external stress may be effectively reduced and cracks due to external stress may be prevented.

Figure 4:
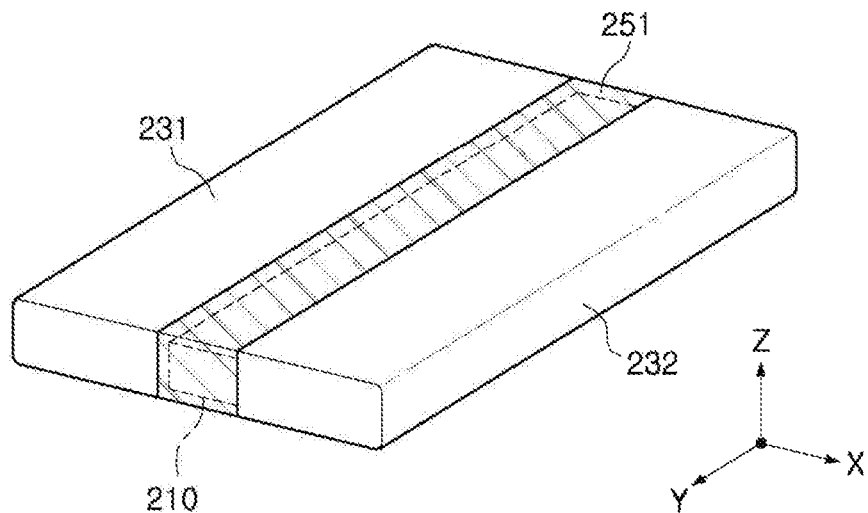
FIG. 4 is a perspective view illustrating a multilayer ceramic electronic component according to another embodiment of the present disclosure.
Figure 5:
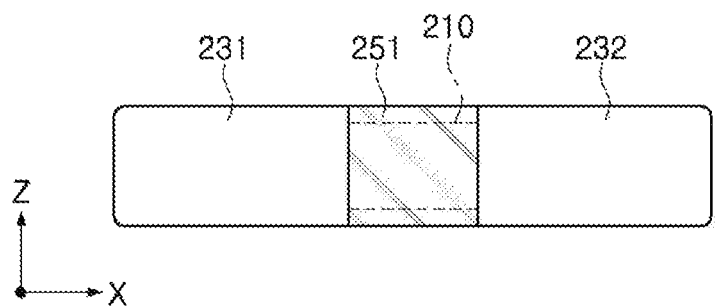
FIG. 5 is a front view of the multilayer ceramic electronic component of FIG. 4.

In another embodiment of the present disclosure, a reinforcing member may be further disposed on the third and fourth surfaces of the ceramic body. FIG. 4 is a perspective view of the embodiment of the present disclosure, and FIG. 5 is a front view of FIG. 4 viewed from a Y-axis direction. Referring to FIGS. 4 and 5, the reinforcing member 251 may be disposed on the first surface, the second surface, the third surface, and the fourth surface of the ceramic body 210, and may be bonded to the first external electrode 231 and the second external electrode 232.

Therefore, in the present embodiment, when the multilayer ceramic electronic component of the present disclosure is viewed externally, only a first external electrode 231, a second external electrode 232 and a reinforcing member 251 may be seen, and a ceramic body 210 may be located inside the first and second external electrodes 231 and 232 and the reinforcing member 251. As in the present embodiment, when a reinforcing member 251 is disposed on the first surface, the second surface, the third surface, and the fourth surface of the ceramic body 210 and the reinforcing member 251 is bonded to the first external electrode 231 and the second external electrode 232, a stress alleviating effect due to the reinforcing member 251 may be maximized, and cracks that may occur in the electronic components may be prevented.

In an embodiment of the present disclosure, the reinforcing member applied to the multilayer ceramic electronic component according to the present disclosure may include a heat-resistant resin. The heat-resistant resin may be a high heat-resistant resin capable of withstanding a mounting temperature (300° C. or higher) of the electronic component. When the reinforcing member is formed of the heat-resistant resin, the heat-resistant resin may be applied directly to the outside of the electronic component having the ceramic body and the external electrodes, and the heat-resistant resin may then be cured to form the reinforcing member. In this case, the first external electrode and the second external electrode may be bonded to the reinforcing member during the curing process of the heat-resistant resin.

In another embodiment of the present disclosure, the reinforcing member applied to the multilayer ceramic electronic component may include a thermosetting resin and a fiber reinforcing material. The thermosetting resin may include one or more selected from a group consisting of an epoxy resin, a phenoxy resin, a polyimide resin, a polyamideimide (PAI) resin, a polyetherimide (PEI) resin, a polysulfone (PS) resin, a polyethersulfone (PES), a polyphenylene ether (PPE) resin, a polycarbonate (PC) resin, a polyetheretherketone (PEEK) resin, and a polyester resin. The fiber reinforcing material may be added to increase strength of the reinforcing member, and may be a glass fiber, a glass cloth, or a glass fabric. In the multilayer ceramic electronic component, a thermosetting resin including a fiber reinforcing material may be applied to the outside of the electronic component in which the ceramic body and the external electrodes are formed, and then the reinforcing member may be formed by passing the thermosetting resin. In this case, the first external electrode and the second external electrode may be bonded to the reinforcing member during the curing process of the thermosetting resin.

Figure 6:
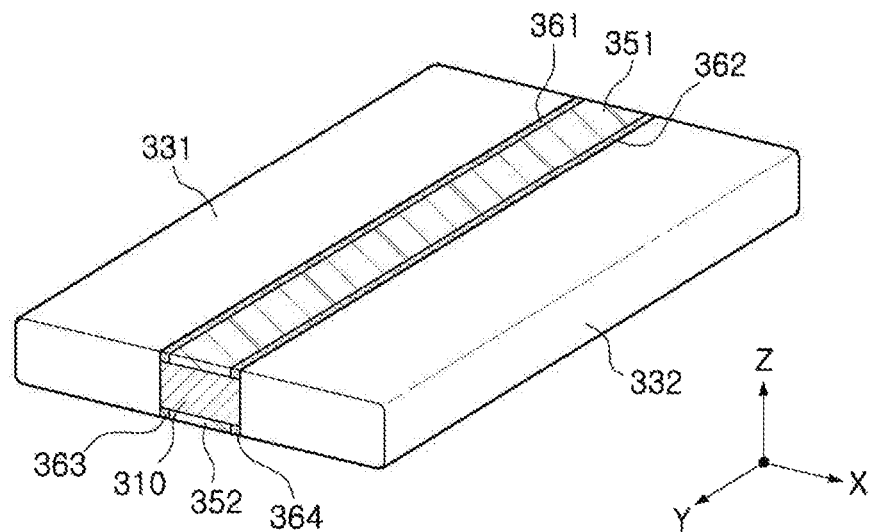
FIG. 6 is a perspective view illustrating a multilayer ceramic electronic component according to another embodiment of the present disclosure.
Figure 7:
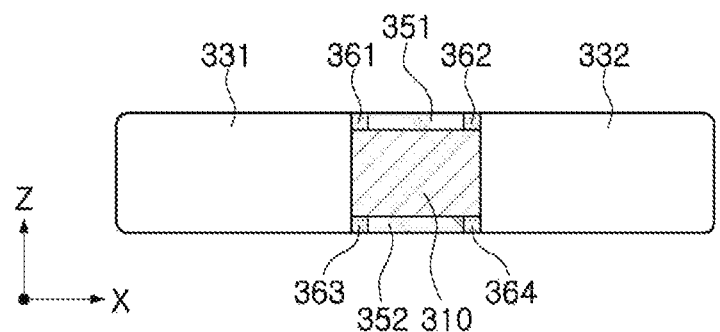
FIG. 7 is a front view of the multilayer ceramic electronic component of FIG. 6.

According to another embodiment of the present disclosure, an adhesive layer may be further disposed at an interface between the reinforcing member and the first external electrode and at an interface between the reinforcing member and the second external electrode. FIG. 6 is a perspective view of the multilayer ceramic electronic component according to the present embodiment, and FIG. 7 is a front view of FIG. 6 viewed from a Y-axis direction. Referring to FIGS. 6 and 7, a reinforcing member 351 is disposed on a first surface and a second surface of a ceramic body 310 and is adhered to a first external electrode 331 and a second external electrode 332 via adhesive layers 361, 362, 363, and 364.

Figure 8:
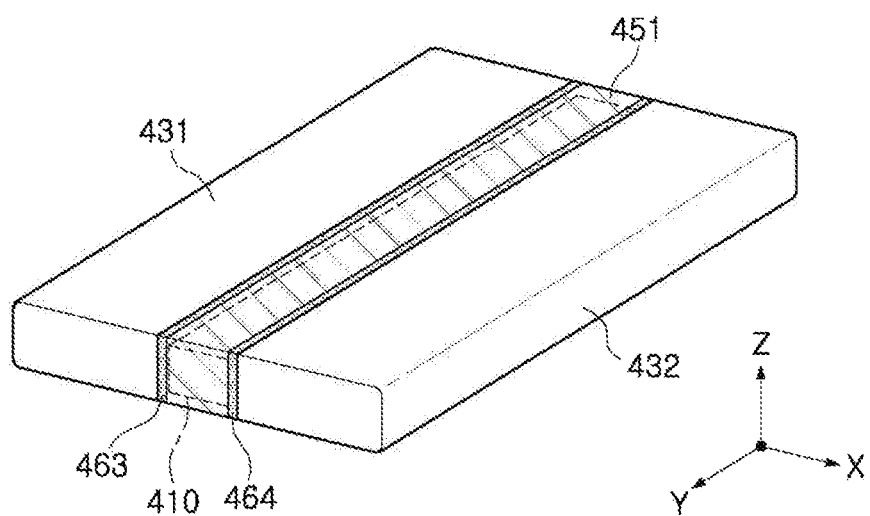
FIG. 8 is a perspective view illustrating a multilayer ceramic electronic component according to another embodiment of the present disclosure.
Figure 9:
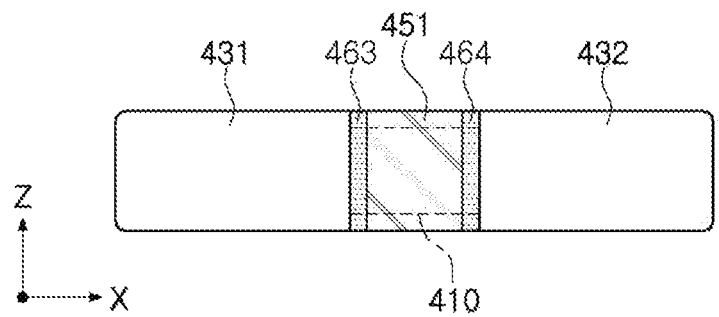
FIG. 9 is a front view of the multilayer ceramic electronic component of FIG. 8.

FIGS. 8 and 9 illustrate another embodiment of the present disclosure. FIG. 8 is a perspective view of a multilayer ceramic electronic component according to the present embodiment, and FIG. 9 is a front view of FIG. 8 view from a Y-axis direction. Referring to FIGS. 8 and 9, a reinforcing member 451 is disposed on a first surface, a second surface, a third surface, and a fourth surface of a ceramic body 410 and is adhered to a first external electrode 431 and a second external electrode 432 via adhesive layers 463 and 464.

The adhesive layer is not particularly limited as long as it can adhere the reinforcing member to the first external electrode and the second external electrode, but, may be, for example, the thermosetting resin described above.

In an embodiment of the present disclosure, the reinforcing member may include a barium titanate ($BaTiO_3$)-based material. Various ceramic additives, organic solvents, plasticizers, binders, dispersants, and the like may be added to a barium titanate ($BaTiO_3$)-based powder according to a purpose of the present disclosure. For example, a ceramic material having the same composition as the dielectric layer may be used.

Figure 11:
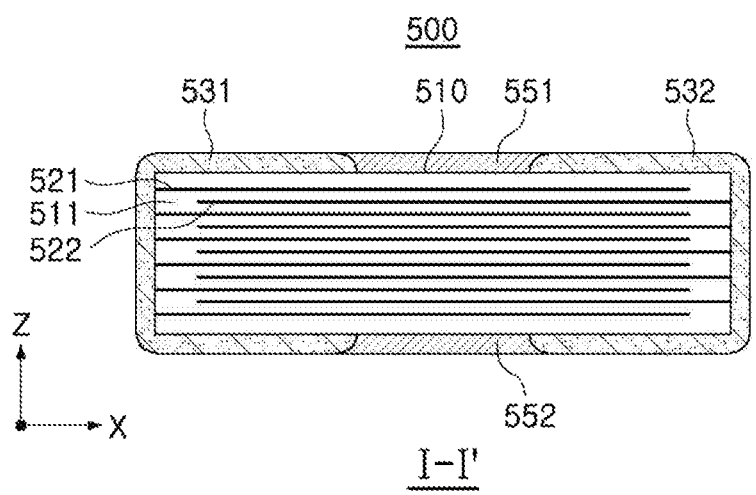
FIG. 11 is a cross-sectional view of the multilayer ceramic capacitor of FIG. 10 following attachment of the reinforcing material.

According to an embodiment of the present disclosure, the ceramic body of the multilayer ceramic electronic component may include a first internal electrode and a second internal electrode, disposed to oppose each other with a dielectric layer interposed therebetween. FIG. 10 is a perspective view illustrating a multilayer ceramic electronic component before the reinforcing member is attached, and FIG. 11 is a cross-sectional view illustrating that a reinforcing member is attached to the multilayer ceramic capacitor of FIG. 10. Referring to FIGS. 10 and 11, the multilayer ceramic electronic component according to an embodiment may include a ceramic body 510 including dielectric layers 511; and first and second external electrodes 531 and 532 formed at both end portions of the ceramic body. The ceramic body 510 may include an active portion including pluralities of first and second internal electrodes 521 and 522 alternately stacked so as to be respectively exposed through opposing end surfaces 5 and 6 of the ceramic body 510 with the dielectric layers 511 interposed therebetween to form capacitance. Cover portions are formed in upper and lower portions of the active portion. Reinforcing members 551 and 552 are formed in a space between the first and second external electrodes 531 and 532 on upper and lower surfaces of the body, respectively.

Hereinafter, a multilayer ceramic electronic component according to an embodiment of the present disclosure will be described, but the multilayer ceramic capacitor is illustrative and the present disclosure is not limited thereto.

In one example, a thickness of the ceramic body 510 may be 100 μm or less. As described above, the thickness of the ceramic body 510 may be applied to a multilayer ceramic capacitor to be embedded in a board and a multilayer ceramic capacitor that may be mounted as a LSC type in a lower end portion of AP by making the thickness of the ceramic body 510 to 100 μm or less. In addition, the thickness of the ceramic body 510 may be a vertical distance between the first and second surfaces 1 and 2.

According to an embodiment of the present disclosure, a raw material for forming the dielectric layer 511 is not particularly limited as long as sufficient electrostatic capacitance may be obtained therewith. For example, the raw material for forming the dielectric layer 511 may be a barium titanate ($BaTiO_3$) powder. In the barium titanate ($BaTiO_3$) powder, calcium (Ca), zirconium (Zr) and/or strontium (Sr) may be partially dissolved.

As materials for forming the dielectric layer 511, a variety of ceramic additives, organic solvents, plasticizers, binders, dispersants, and the like, may be added to the powder, barium titanate (BaTiO3), and the like, according to purposes of the present disclosure.

An average particle diameter of the ceramic powder used for forming the dielectric layer 511 is not particularly limited, and may be adjusted for achieving the purpose of the present disclosure, but may be adjusted to, for example, 400 nm or less.

The ceramic body 510 may include an active portion serving as a portion contributing to capacitance formation of the capacitor and upper and lower cover portions respectively formed in upper and lower portions of the active portion as upper and lower margin portions.

The active portion may be formed by repeatedly laminating a plurality of first and second internal electrodes 521 and 522 with the dielectric layer 511 interposed therebetween.

The upper and lower cover portions may have the same material and configuration as the dielectric layer 511 except that they do not include internal electrodes.

The upper and lower cover portions may be formed by laminating a single dielectric layer or two or more dielectric layers on each of the upper and lower surfaces of the active portion in a vertical direction, respectively, and the upper and lower cover portions may basically serve to prevent damages to the internal electrodes due to physical or chemical stress.

In general, ceramic films (e.g., dielectric layers) inside a multilayer ceramic capacitor are alternately laminated with metal films (e.g., internal electrodes) having high fracture strength, such that the ceramic films (e.g., dielectric layers) may have higher fracture strength than a single structure made only of a ceramic material. However, since a ceramic layer constituting the cover portion is not protected by the metal film, when the thickness is not secured to a certain level or more, the fracture strength may be drastically lowered. Specifically, when the thickness of the cover portion is reduced to be 1/40 or less compared to the length of the ceramic body or is reduced to be 1/5 or less of the thickness of the ceramic body, the fracture strength may be drastically lowered.

Therefore, in the case of a general multilayer ceramic capacitor to be embedded in a board, thicknesses of the upper and lower cover portions may be formed to be sufficiently thick so as to prevent the internal electrodes from being damaged due to the lowering of the fracture strength.

However, when the thicknesses of the upper and lower cover portions are formed to be thick, a current path inside the multilayer ceramic capacitor to be embedded in the board may be elongated, and thus it may be difficult to reduce an equivalent series inductance (ESL). In addition, as in an embodiment of the present problem, there is a problem that the thickness of the cover portion may not be increased in the case of a multilayer ceramic capacitor having a thickness of 100 μm or less.

On the other hand, in the multilayer ceramic electronic component according to the present disclosure, it is possible to prevent external cracks from occurring by reducing the external stress without forming the upper and lower cover portions to be thick.

Figure 12:
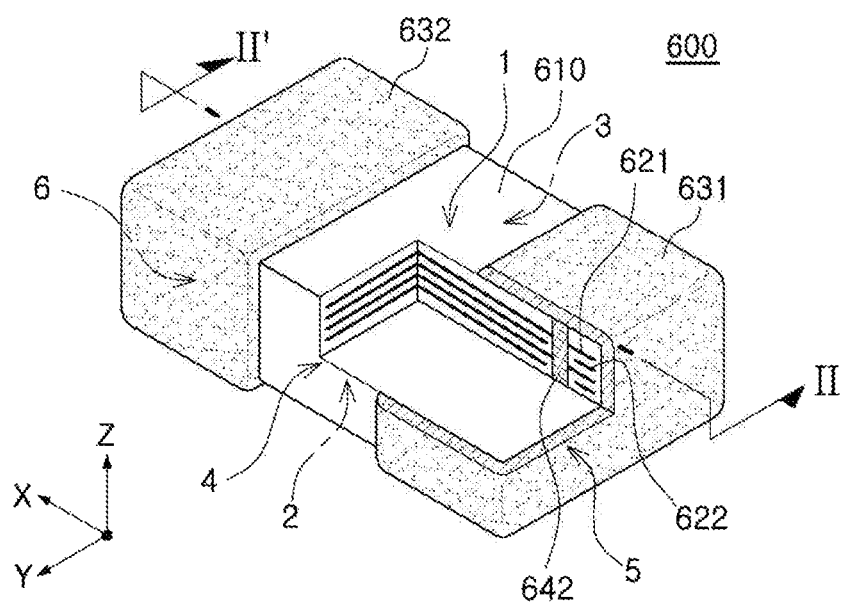
FIG. 12 is a perspective view of a multilayer ceramic capacitor before attaching a reinforcing material according to another embodiment of the present disclosure.
Figure 13:
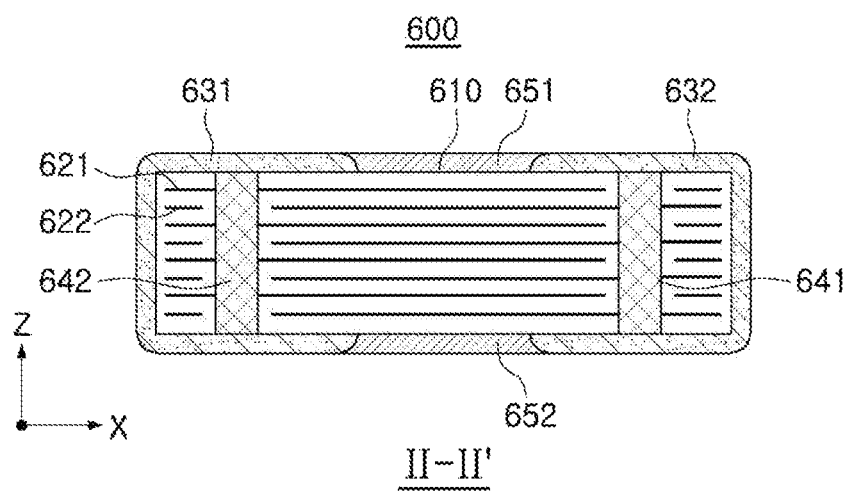
FIG. 13 is a cross-sectional view of the multilayer ceramic capacitor of FIG. 12 following attachment of the reinforcing material.

FIG. 12 is a perspective view illustrating a multilayer ceramic capacitor, illustratively shown without a reinforcing member for clarity of illustration, and FIG. 13 is a cross-sectional view illustrating a multilayer ceramic capacitor with the reinforcing member attached thereto. Referring to FIGS. 12 and 13, the multilayer ceramic electronic component of the present disclosure may further include a first connection electrode 642 penetrating through a ceramic body 610 to be connected to the first internal electrode(s) 621 and a second connection electrode 641 penetrating the ceramic body 610 to be connected to the second internal electrode(s) 622. The first connection electrode 642 may be electrically connected to a first external electrode 631 and the second connection electrode 641 may be electrically connected to a second external electrode 632.

The first and second internal electrodes, the first and second external electrodes, and the first and second connection electrodes may be formed of a conductive material, and the conductive material is not particularly limited, but may include nickel (Ni) and/or copper (Cu), and the like.

Figure 14:
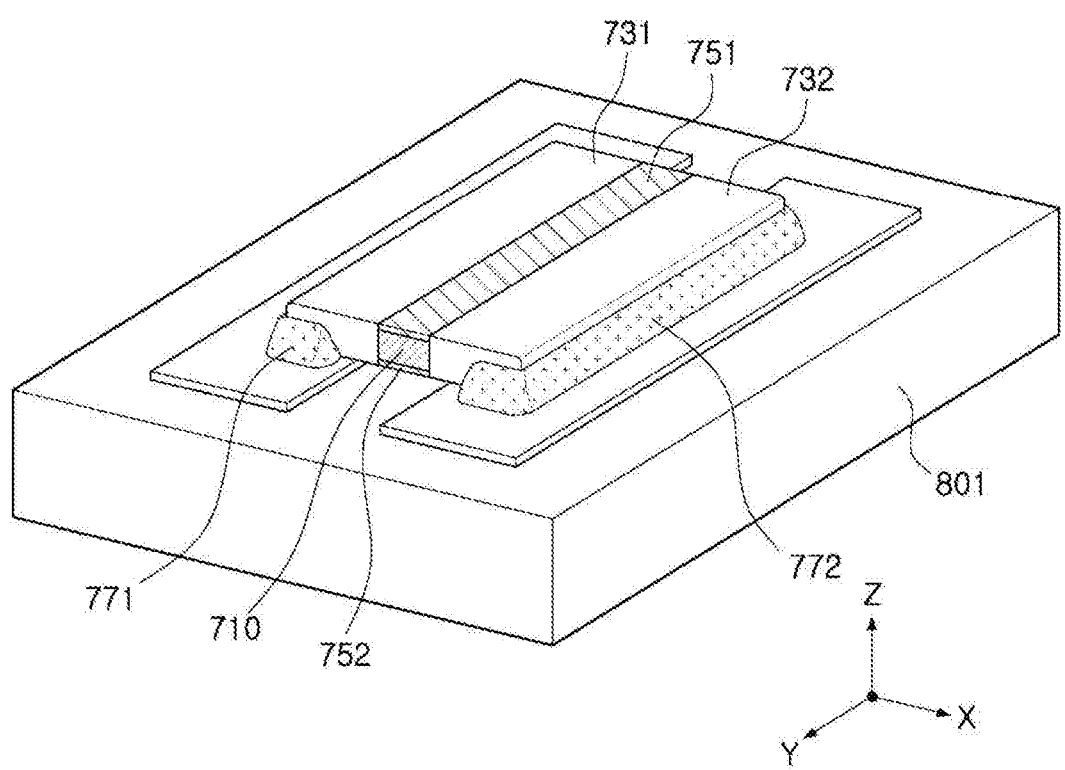
FIG. 14 is a perspective view illustrating a mounting board of a multilayer ceramic electronic component according to an embodiment of the present disclosure.

As illustrated in FIG. 14, the present disclosure also relates to a mounting board of a multilayer ceramic electronic component. The mounting board of the multilayer ceramic electronic component may include a printed circuit board 801 having two or more electrode pads; a multilayer ceramic electronic component mounted on the printed circuit board 801; and a solder 771 and 772 connecting the electrode pads to the multilayer ceramic electronic component, wherein the multilayer ceramic electronic component may include a ceramic body 710 including a dielectric layer and having a first surface and a second surface opposite each other, a third surface and a fourth surface opposite each other, and a fifth surface and a sixth surface opposite each other; a first external electrode 731 and a second external electrode 732 respectively disposed on the fifth and sixth surfaces of the ceramic body; and a reinforcing member 751 and 752 adhered to the first external electrode 731 and the second external electrode 732 and disposed on the first and second surfaces.

In another embodiment of the present disclosure, a coefficient of thermal expansion (CTE) of the reinforcing member of the mounting board of the multilayer ceramic electronic component of the present disclosure may be within a range of 1 to 4 times a coefficient of thermal expansion of the dielectric layer.

In another embodiment of the present disclosure, a modulus of the reinforcing member of the mounting board of the multilayer ceramic electronic component of the present disclosure may be 0.5 or more times a modulus of the dielectric layer.

A detailed description of the multilayer ceramic electronic component is the same as that of the multilayer ceramic electronic component according to an embodiment of the present disclosure described above, and thus will be omitted here.

Table 1 below shows that a relative value (or ratio) of a stress to which the multilayer ceramic capacitor, to which a reinforcing member is applied, is subjected to relative to the stress to which the multilayer ceramic capacitor, to which the reinforcing member is not applied, is subjected to.

TABLE 1

| Sample | 1 | 2 | 3 | 4 |
|---|---|---|---|---|
| Stress | 1 | 0.41 | 1.02 | 1.08 |

The sample was prepared by using a ceramic green sheet having a coefficient of thermal expansion of 7.6 ppm/° C. and a modulus of 136.5 GPa as a reinforcing member and adhering the reinforcing member to an external electrode by using a novolac-based epoxy adhesive.

Sample 1 is a result of a structure without the reinforcing member, and Sample 2 is a result of a structure in which the reinforcing member is adhered to the first to fourth surfaces of the ceramic body. Sample 3 is a result of a structure in which the reinforcing member is adhered only to the first surface, that is, the upper surface of the ceramic body, and Sample 4 is a result of a state in which the reinforcing member is adhered only to the second surface, that is, the lower surface of the ceramic body.

Referring to Table 1 above, it can be seen that the stress applied to the capacitor is rather increased when the reinforcing member is adhered to only one of the upper and lower cover portions of the ceramic body, which illustrates that the stress is concentrated on a region to which the reinforcing member is not adhered, and the stress is hardly reduced.

In comparison, it can be seen that maximum stress is reduced by about 59% in the case of Sample 2 in which the reinforcing member is adhered to the first to fourth surfaces of the ceramic body. It shows that the stress applied to the dielectric layer of the capacitor may be relaxed by dispersing the stress applied to the capacitor by the reinforcing member adhered to the external electrode, and it can be seen that cracks due to external stress may be prevented.

As set forth above, according to an embodiment of the present disclosure, a multilayer ceramic electronic component and a mounting board thereof capable of preventing cracking and relaxing stress applied to the component may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component, comprising:
    a ceramic body including a dielectric layer and having a first surface and a second surface opposing each other, a third surface and a fourth surface opposing each other, and a fifth surface and a sixth surface opposing each other;
    a first external electrode and a second external electrode respectively disposed on the fifth surface and the sixth surface of the ceramic body; and
    a reinforcing member bonded to the first external electrode and the second external electrode and disposed on the first surface and the second surface,
    wherein a coefficient of thermal expansion (CTE) of the reinforcing member is within a range of 1 to 4 times a coefficient of thermal expansion of the dielectric layer.

2. The multilayer ceramic electronic component of claim 1, wherein a modulus of the reinforcing member is 0.5 or more times a modulus of the dielectric layer.

3. The multilayer ceramic electronic component of claim 1, wherein the reinforcing member is further disposed on the third surface and the fourth surface of the ceramic body.

4. The multilayer ceramic electronic component of claim 1, wherein the reinforcing member comprises a heat-resistant resin.

5. The multilayer ceramic electronic component of claim 1, wherein the reinforcing member comprises a thermosetting resin and a fiber reinforcing material.

6. The multilayer ceramic electronic component of claim 1, wherein an adhesive layer is further disposed at an interface between the reinforcing member and the first external electrode and at an interface between the reinforcing member and the second external electrode to bond the reinforcing member to the first external electrode and the second external electrode.

7. The multilayer ceramic electronic component of claim 1, wherein the reinforcing member comprises a barium titanate ($BaTiO_3$)-based ceramic material.

8. The multilayer ceramic electronic component of claim 1, wherein the ceramic body comprises a first internal electrode and a second internal electrode disposed on opposite surface of the dielectric layer interposed therebetween.

9. The multilayer ceramic electronic component of claim 8, further comprising a first connection electrode penetrating through the ceramic body to be connected to the first internal electrode and a second connection electrode penetrating through the ceramic body to be connected to the second internal electrode,
    wherein the first connection electrode is electrically connected to the first external electrode and the second connection electrode is electrically connected to the second external electrode.

10. The multilayer ceramic electronic component of claim 1, wherein the reinforcing member extends on each of the first and second surfaces from an edge shared with the third surface to an edge shared with the fourth surface.

11. A mounting board of a multilayer ceramic electronic component comprising:
    a printed circuit board having two or more electrode pads;
    a multilayer ceramic electronic component mounted on the printed circuit board; and
    a soldering connecting the electrode pads and the multilayer ceramic electronic component,
    wherein the multilayer ceramic electronic component comprises a ceramic body including a dielectric layer and having a first surface and a second surface opposing each other, a third surface and a fourth surface opposing each other, and a fifth surface and a sixth surface opposing each other; and a reinforcing member bonded to the first external electrode and the second external electrode and disposed on the first and second surfaces, and
    wherein a coefficient of thermal expansion (CTE) of the reinforcing member is within a range of 1 to 4 times a coefficient of the dielectric layer.

12. The mounting board of the multilayer ceramic electronic component of claim 11, wherein a modulus of the reinforcing member is 0.5 or more times a modulus of the dielectric layer.

13. A multilayer ceramic capacitor comprising:
    a ceramic body including a plurality of first internal electrodes and a plurality of second internal electrodes alternately stacked with dielectric layers therebetween;
    first and second external electrodes disposed on opposing surfaces of the ceramic body opposite each other in a stacking direction of the pluralities of first and second internal electrodes; and
    a reinforcing member disposed in a space between the first and second external electrodes on the opposing surfaces of the ceramic body opposite each other in the stacking direction,
    wherein a coefficient of thermal expansion (CTE) of the reinforcing member is within a range of 1 to 4 times a coefficient of thermal expansion of the dielectric layers.

14. The multilayer ceramic capacitor of claim 13, wherein the reinforcing member extends to and contacts the first and second external electrodes to fill an entirety of the space between the first and second external electrodes on the opposing surfaces of the ceramic body opposite each other in the stacking direction.

15. The multilayer ceramic capacitor of claim 13, wherein the reinforcing member is disposed only on portions of the opposing surfaces of the ceramic body opposite each other in the stacking direction that are disposed between the first and second external electrodes.

16. The multilayer ceramic capacitor of claim 13, wherein the first and second external electrodes are further disposed on opposing side surfaces of the ceramic body connecting the opposing surfaces, and
    the reinforcing member is disposed in a space between the first and second external electrodes on the opposing side surfaces.

17. The multilayer ceramic capacitor of claim 13, further comprising an adhesive layer disposed at an interface between the reinforcing member and the first external electrode and at an interface between the reinforcing member and the second external electrode,
    wherein the reinforcing member and adhesive layer fill an entirety of the space between the first and second external electrodes on the opposing surfaces of the ceramic body opposite each other in the stacking direction.

18. The multilayer ceramic capacitor of claim 13, wherein the reinforcing member has a substantially same thickness as the first and second external electrodes on the opposing surfaces of the ceramic body opposite each other in the stacking direction.

19. The multilayer ceramic capacitor of claim 13, wherein a modulus of the reinforcing member is 0.5 or more times a modulus of the dielectric layer.

* * * * *